United States Patent [19]

Scholten et al.

[11] Patent Number: 4,755,583

[45] Date of Patent: Jul. 5, 1988

[54] EPOXY-(1,1,1)TRIMETHYLOL ALKANE COPOLYMERS

[75] Inventors: Henricus P. H. Scholten; Tette J. Dijkstra; Roeland van Iperen, all of Amsterdam, Netherlands

[73] Assignee: Shell Oil Company, Houston, Tex.

[21] Appl. No.: 46,014

[22] Filed: May 5, 1987

[30] Foreign Application Priority Data

May 6, 1986 [GB] United Kingdom ............... 8611013

[51] Int. Cl.$^4$ .............................................. C08G 59/62
[52] U.S. Cl. ...................................... 528/110; 528/92; 528/106; 528/500; 427/314; 427/315
[58] Field of Search ............... 528/92, 110, 106, 500; 427/314, 315

[56] References Cited

U.S. PATENT DOCUMENTS

| | | | |
|---|---|---|---|
| 2,731,444 | 1/1956 | Greenlee | 528/110 |
| 2,911,377 | 11/1959 | Gurgiolo | 528/410 |
| 2,933,459 | 4/1960 | Gurgiolo | 528/409 |
| 3,182,099 | 5/1965 | Clark | 525/407 |
| 4,282,387 | 8/1981 | Olstowski | 568/618 |
| 4,314,923 | 2/1982 | Chang | 524/377 |

FOREIGN PATENT DOCUMENTS 139042 2/1985 European Pat. Off. .

*Primary Examiner*—Earl Nielsen
*Assistant Examiner*—Frederick Krass

[57] ABSTRACT

Process for the preparation of a polyether resin by reacting a diglycidyl ether of a dihydric phenol with an alcohol of formula R-C(CH$_2$OH)$_3$, R being C$_{1-4}$-alkyl, using an equivalent ratio $e_{OH}$ to $e_{epoxy} > 1$ and selecting $P > 1.05$, wherein $$P = \frac{e_{OH}}{3 \times e_{epoxy}} + \frac{1}{F_{epoxy}} \quad (1)$$

$F_{epoxy}$ being the epoxy functionality of the diglycidyl ether.

19 Claims, No Drawings

EPOXY-(1,1,1)TRIMETHYLOL ALKANE COPOLYMERS

BACKGROUND OF THE INVENTION

This invention relates to the preparation of polyether resins. In a specific aspect, the invention relates to the reaction of an epoxy resin with a polyhydric alcohol so as to prepare a polyether resin essentially free of epoxide groups.

Polyether resins prepared by the reaction of an epoxy resin and an aliphatic polhydric alcohol are useful resin constituents of coating formulations. U.S. Pat. No. 2,731,444 describes various reaction products of epoxy resins and aliphatic polyhydric alcohols in terms of the equivalent ratios of the reactants and the desired remaining epoxide groups, if any, in the product. Examples 42–49 of the patent describe a process in which an equivalent excess of a polyhydric alcohol is reacted with an epoxy resin to prepare a reaction product containing both unreacted epoxy and unreacted hydroxyl groups. The described process involves very high reaction temperatures, such as 250° C., and does not react all the epoxide groups present. Further heating of the epoxide-containing product of Example 42 produced a hard, infusible "gel." Such a gel is not suitable as a starting material for the preparation of curable coating compositions. It has been found that the use of an even greater ratio of hydroxy to epoxy and a lower temperature also results in a gelled product.

It is therefore an object of the invention to provide a process for preparing a reaction product of an epoxy resin and a polyhydric alcohol which has essentially no epoxide groups. In one embodiment, it is an object of the invention to provide a relatively low-temperature reaction process for preparing a polyester resin having essentially no epoxide groups.

SUMMARY OF THE INVENTION

According to the invention, a polyether resin is produced by reacting a diglycidyl ether of a dihydric phenol having an average of less than 2 epoxy groups per molecule and an alcohol of the general formula (A)

in which R represents a $C_1$–$C_5$ alkyl group, in the presence of an etherification catalyst, until the reaction product obtained is substantially free from epoxy groups, using an equivalent ratio $$\frac{e_{OH}}{e_{epoxy}}$$

of greater than 1, in which $e_{OH}$ is the total number of hydroxy equivalents introduced by the alcohol of the general formula (A) and $e_{epoxy}$ is the total number of epoxy equivalents introduced by the diglycidyl ether, and selecting a value for P of greater than 1.05, P being calculated according to formula (1)

$$P = \frac{e_{OH}}{3 \times e_{epoxy}} + \frac{1}{F_{epoxy}} \quad (1)$$

in which $e_{OH}$ and $e_{epoxy}$ are as defined above and $F_{epoxy}$ is defined as $$2a/b$$

in which "a" and "b" are the concentrations of epoxy groups and of total end groups, respectively, in the starting diglycidyl ether.

The use of the invention process enables the preparation at relatively low temperatures of polyether resins which are substantially free from epoxy groups without gelation of the product. Cured films prepared from the polyether resins have very good properties in can and general industry stoving applications, good sterilization resistance, salt spray resistance and good flexibility.

DETAILED DESCRIPTION OF THE INVENTION

The invention process involves the reaction of a diglycidyl ether of a dihydric phenol having an average of less than 2 epoxy groups per molecule, preferably a diglycidyl ether of 2,2-bis(4-hydroxyphenyl)propane having a general formula of

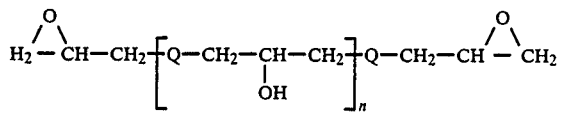

in which Q represents the divalent radical obtained by removal of the two H atoms from the OH groups in the dihydric phenol and n has an average value in the range of from 0 to about 30. Theoretically, diglycidyl ethers from a dihydric phenol have two terminal glycidyl groups per molecule, but in practice non-glycidyl terminal groups are present; these groups almost completely consist of 2,3-dihydroxypropoxy, monochlorohydroxypropoxy and hydroxyl groups. The value of "b" referred to above is the total of epoxy groups and these three non-glycidyl terminal groups. The diglycidyl ethers can be further defined by their "a" value, which is the concentration of epoxy groups in the starting epoxy resin expressed in milligram equivalents per gram. Diglycidyl ethers of bisphenol-A having an "a" value from, for example, 3.5 to 6 are the so-called "liquid" epoxy resins which at room temperature are viscous liquids. Diglycidyl ethers of bisphenol-A having an "a" value from 0.2 to 2.5 are solid resins and usually melt in the range of from 50° to 130° C. In general, the concentration of non-glycidyl end groups increases with increasing value for n. Hence, the value for $F_{epoxy}$ decreases with increasing value for n, $F_{epoxy}$ being the ratio 2a:b.

Further examples of epoxy resins having an average of less than two epoxy groups per molecule are polyglycidyl ethers having an average n epoxy groups per molecule, where $1 < n \leq 2$, which ethers are the reaction product of a multifunctional polyglycidyl ether having an average of x epoxy groups per molecule, where $x > 2$, with (x-n) mol of a monofunctional phenol per mol of the multifunctional polyglycidyl ether, as described in European patent application No. 0 0127 915.

The reaction mixture includes an alcohol of the general formula

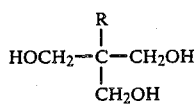

in which R represents a $C_1$–$C_4$ alkyl group. The alkyl group R is preferably a methyl or an ethyl group, the alcohol being 1,1,1-tri-(hydroxymethyl)propane or 1,1,1-tri(hydroxymethyl)ethane. Preference is given to the former alcohol, because it melts at 58° C. and can act as a solvent, which simplifies the preparation of the polyether.

The process according to the present invention may schematically be represented by means of the following reaction equation:

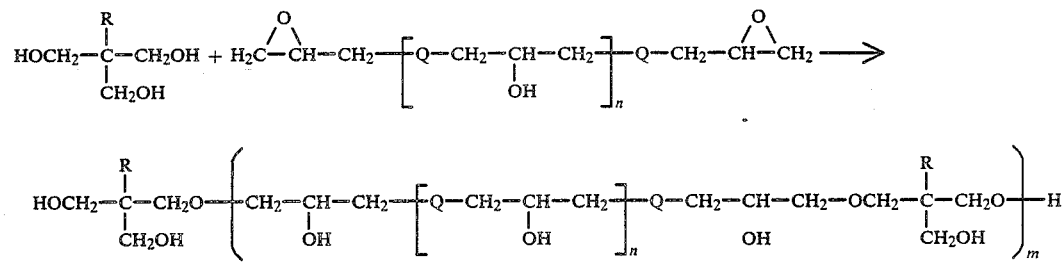

in which R, Q and n are as defined above and m may have an average value from 1 to, for example, 10. The product polyether resin is substantially free of epoxy groups. As used herein, a polyether resin is "substantially free" of epoxy groups when it contains less than about 0.15 meq epoxy groups per g of resin.

A requirement for preventing the formation of a gel is selection of a ratio of the total number of hydroxy equivalents introduced by the alcohol of the general formula (A) to the total number of epoxy equivalents introduced by the diglycidyl ether which is greater than 1. In this manner, the chance of side reactions of epoxy groups with secondary hydroxy groups of the polyether resin and/or of the epoxy resin is reduced. Such side reactions form branched structures and increase the danger of gel formation. Preferably, said ratio is not more than 5; the use of ratios of more than 5 is, however, not excluded.

The second requirement for preventing the formation of a gel is the fundamental inequality referred to above, P>1.05, the value for P being calculated according to formula (1). Preferably, a value for P of not more than 3.0 and more preferably not more than 2.0 is selected.

The reaction product mixture obtained in the process according to the invention contains unreacted alcohol of the general formula (A). This unreacted alcohol need not be separated from the polyether resin. However, it is preferred to separate unreacted alcohol from the polyether resin, because this results in cured film coatings having improved flexibility. The alcohol may be removed from the polyether resin by means of stripping, for example with steam, nitrogen or carbon dioxide.

Examples of etherification catalysts are amines and Lewis acids, for example alkanoates and halides of iron, zinc, aluminium and boron, and alkai metal alcoholates of polyoxyalkylene polyols. According to a preferred embodiment of the invention, a stannous salt is used as an etherification catalyst. The stannous salt is preferably a salt of an alkanoic acid, particularly of those having in the range of from 2 to 30 carbon atoms per molecule. Very good results have been obtained with stannous octoate. Other preferred stannous salts are stannous halides, particularly stannous chloride.

If desired, the process according to the invention may be carried out in the presence of a suitable non-reactive solvent, for example hydrocarbons such as octane, nonane, decane, toluene, the three xylenes, ethylbenzene or isopropylbenzene; ethers such as 1,4-dioxane, diethyl ether of ethylene glycol, diethyl ether of diethylene glycol; and chlorinated hydrocarbons such as monochlorobenzene.

The process according to the invention can be carried out at a temperature which can vary within wide limits, preferably in the range of from about 100° C. to about 250° C. and more preferably from about 125° C. to about 200° C. An advantage of the invention process is that it permits preparation of an epoxy-free product at temperatures less than 200° C.

Curable coating compositions can be prepared by addition of a cross-linking resin to the polyether resin prepared by the invention process. The amount of such cross-linking resins is usually in the range of from 5 to 50% by weight, calculated on the total of polyether resin and cross-linking resin. Examples of suitable cross-linking resins are those of the aminoplast-type, such as alkoxylated reaction products of formaldehyde with melamine or benzoguanamine. Other cross-linking agents include urea-formaldehyde resins, phenol-formaldehyde resins, and blocked polyisocyanates. Suitable catalysts which may be employed in the curable coating compositions are acids such as orthophosphoric acid or p-toluenesulphonic acid. These catalysts may be used in an amount in the range of from, for example, 0.05 to 2% by weight, calculated on polyether resin and cross-linking resin. Other examples of suitable cross-linking resins are non-acidic polyesters of polycarboxylic acids which esters have more than one, and preferably at least two, beta-hydroxyl ester groups per molecule. When such polyesters are used, a transesterification catalyst should be present, for example transesterification-promoting metal compounds, for example, salts (e.g. octoates, acetates or naphthenates) of lead, zinc, calcium, barium and iron(III). A suitable example of a metal complex is titanium acetylacetonate. Other suitable salts, although in general less active than those mentioned above, are salts of tin(II), manganese, cobalt and dibutyltin, for example dibutyltin dilaurate. Further metal salts that can be mentioned in general are octoates and naphthenates of the alkali and alkaline earth metals, of the lanthanides, and of zirconium, cadmium, chromium, and acetylacetonate complexes of lead, zinc, cadmium, cerium, thorium and copper. Mixtures of such salts and/or complexes may be used. Metal content of the transesterification-promoting metal compounds should preferably be in the range 0.3 to 2 weight percent.

Pigments, fillers, dispersing agents and other components known in the art of paint formulation may be added.

The curable coating compositions can be applied by a variety of methods as known in the art, for example by spraying, dipping or roller coating. The coatings can be hardened by stoving, for example at temperatures from 100° to 300° C., with curing times varying from, for example, 10 seconds to 30 minutes.

The invention will be further understood from the following examples. In each of these examples a round-bottom glass reactor was used which was equipped with an anchor stirrer, thermocouple, reflux condenser and inlet tubes.

EPIKOTE ® Resin is a tradename for commercial diglycidyl ethers of 2,2-bis(4-hydroxyphenyl)propane. Table 1 indicates which EPIKOTE resins were used and mentions the values of "a" and "b" and "$F_{epoxy}$" thereof.

TABLE 1

| EPIKOTE ® Resin | Concentration of epoxy groups, a, meq per g | Concentration of total end groups, b, meq per g | $F_{epoxy}$ |
|---|---|---|---|
| 828 | 5.320 | 5.380 | 1.98 |
| 1001 | 2.080 | 2.291 | 1.82 |
| 1055 | 1.115 | 1.406 | 1.59 |
| 1007 | 0.570 | 0.824 | 1.38 |

1,1,1-Tri(hydroxymethyl)propane is referred to as "TMP" and contained 22.4 meq OH per g. "Shellsol A" is a tradename for a hydrocarbon solvent having a boiling range at atmospheric pressure from 166° C. to 185° C. and containing 98% by volume of aromatic hydrocarbons. The xylene was a commercial mixture of the three xylenes.

"Cymel 301" is a tradename for a commercial liquid hexamethoxymethyl melamine, non-volatiles below 2% by weight.

"Phenodur PR 217" is a tradename for a commercial solution in butanol containing 65% by weight of a phenol-formaldehyde resin.

The pigment component was red iron oxide and the filler component was ASP-100, a tradename for a clay.

EXAMPLES 1 TO 12 AND COMPARATIVE EXPERIMENTS A, B AND C

The reactor was charged with an EPIKOTE ® resin, TMP and a solvent and was heated until a homogeneous liquid was obtained. Then, stannous octoate was added and heating was continued at a temperature between 170° and 175° C. until the reaction product was substantially free from epoxy groups.

Table 2 states which EPIKOTE ® resins were used, the equivalent ratio $e_{OH}:e_{epoxy}$ and the value of P, calculated from this ratio and from the value of $F_{epoxy}$ given in Table 1.

TABLE 2

| Example | Comparative Experiment | EPIKOTE ® Resin | $e_{OH}:e_{epoxy}$ | P |
|---|---|---|---|---|
| 1 | | 828 | 2.25 | 1.26 |
| 2 | | 828 | 1.88 | 1.13 |
| | A | 828 | 1.50 | 1.01 |
| 3 | | 1001 | 2.25 | 1.30 |
| 4 | | 1001 | 1.88 | 1.18 |
| | B | 1001 | 1.50 | 1.05 |
| 5 | | 1055 | 3.00 | 1.63 |
| 6 | | 1055 | 2.63 | 1.51 |
| 7 | | 1055 | 2.25 | 1.38 |
| 8 | | 1055 | 1.88 | 1.26 |
| 9 | | 1055 | 1.50 | 1.13 |
| | C | 1055 | 1.12 | 1.01 |
| 10 | | 1007 | 2.25 | 1.47 |
| 11 | | 1007 | 1.88 | 1.35 |
| 12 | | 1007 | 1.50 | 1.22 |
| 13 | | 828 | 1.88 | 1.13 |
| 14 | | 1001 | 2.25 | 1.30 |
| 15 | | 1055 | 2.63 | 1.45 |
| 16 | | 1007 | 3.00 | 1.72 |

Table 3 shows the amount of the EPIKOTE ® resin, TMP, solvent, which solvent was used, and the amount of stannous octoate.

TABLE 3

| | EPIKOTE ® resin, g | TMP, g | Solvent xylene, | Shellsol ® A | Stannous octoate | Reaction time at 170-175° C., h | 1-Methoxy-2-hydroxy-propane g | Epoxy group content of polyether resin, meq/g | Viscosity, Pa · s |
|---|---|---|---|---|---|---|---|---|---|
| Example | | | | | | | | | |
| 1 | 470 | 251 | 72 | | 3.6 | 5.0 | 653 | 0.09 | 0.5 |
| 2 | 489 | 218 | 71 | | 3.5 | 5.0 | 640 | 0.08 | 1.9 |
| 3 | 606 | 126 | 74 | | 3.7 | 5.5 | 662 | 0.09 | 3.7 |
| 4 | 606 | 105 | 71 | | 3.6 | 8.5 | 644 | 0.09 | 8.6 |
| 5 | 449 | 67 | 52 | | 2.6 | 7.0 | 467 | 0.07 | 4.6 |
| 6 | 449 | 59 | 51 | | 2.5 | 8.0 | 460 | 0.08 | 5.4 |
| 7 | 449 | 50 | 50 | | 2.5 | 8.5 | 452 | 0.08 | 10.0 |
| 8 | 673 | 63 | 74 | | 3.7 | 9.5 | 666 | 0.09 | 26.1 |
| 9 | 673 | 50 | 73 | | 3.6 | 13.0 | 654 | 0.08 | 38.9 |
| 10 | 877 | 50 | | 93 | 4.6 | 5.0 | 839 | 0.06 | 21.5 |
| 11 | 877 | 42 | | 92 | 4.6 | 5.5 | 832 | 0.08 | 24.3 |
| 12 | 877 | 34 | | 92 | 4.6 | 6.0 | 824 | 0.09 | 42.0 |
| Comparative experiment | | | | | | | | | |
| A | 470 | 168 | 64 | | 3.2 | 5.5 | — | 0.36 | |
| B | 606 | 84 | 69 | | 3.5 | 12.5 | — | 0.19 | |
| C | 673 | 38 | 72 | | 3.6 | 7.0 | | 0.27 | |
| Example | | | | | | | | | |
| 13 | 744 | 336 | | | 5.4 | 7.0 | | 0.06 | 1.7 |
| 14 | 944 | 201 | | | 5.7 | 7.0 | | 0.06 | 2.4 |
| 15 | 848 | 118 | | | 4.8 | 6.0 | | 0.05 | 5.4 |
| 16 | 877 | 67 | | | 4.7 | 4.0 | | 0.04 | 13.1 |

The reaction product obtained was cooled and further diluted with 1-methoxy-2-hydroxypropane until the diluted solution had a solids content of 50% by weight, the solids being the polyether resin and stannous octoate.

Table 3 shows the time used for heating at a temperature between 170° and 175° C., the amount of 1-methoxy-2-hydroxypropane used, the epoxy group content of the polyether resin at the end of the reaction time and the viscosity of the diluted solution at 23° C. The epoxy group contents show that the reaction products in the examples were substantially free from epoxy groups and that those obtained in the comparative experiments were not free therefrom.

In each of the examples 1 to 12, the value of P was greater than 1.05 and a gel was not formed. In comparative experiments A, B and C the value of P was not greater than 1.05 and a gel was formed.

EXAMPLES 13 TO 16

The reaction was charged with an EPIKOTE ® Resin and TMP and was heated until a homogeneous liquid was obtained. Then, stannous octoate was added and heating was continued at a temperature of 175° C. until the reaction product was substantially free from epoxy groups.

Table 5 states which EPIKOTE ® Resins were used and shows the values of "a" and "b" and "$F_{epoxy}$" thereof.

TABLE 5

| EPIKOTE ® Resin | Concentration of epoxy groups, a, meq per g | Concentration of total end groups, b, meq per g | $F_{epoxy}$ |
|---|---|---|---|
| 828 | 5.390 | 5.422 | 1.99 |
| 1001 | 2.120 | 2.311 | 1.83 |
| 1055 | 1.180 | 1.351 | 1.75 |
| 1007 | 0.570 | 0.824 | 1.38 |

Table 2 above shows which EPIKOTE ® Resins were used, the equivalent ratio $e_{OH}:e_{epoxy}$ and the value of P, calculated from this ratio and from the value of $F_{epoxy}$ given in Table 5.

Table 3 above shows the amount of the EPIKOTE ® Resin, TMP and stannous octoate.

The reaction product obtained was allowed to adopt ambient temperature. The clear solid polyether resin thus obtained was dissolved in a mixture of 9 parts by weight of 1-methoxy-2-hydroxypropane and 1 part by weight of xylene to obtain a solution containing 50% by weight of solid material. The viscosity of the solution at 23° C. is given in Table 3.

EXAMPLE 17

The reactor was charged with EPIKOTE ®1007 (877 g, a=0.570 meq per g, b=0.824 meq per g, $F_{epoxy}$=1.38), TMP (42 g) and Shellsol A ® (92 g) and was heated until a homogeneous liquid was obtained, the equivalent ratio $e_{OH}:e_{epoxy}$ being 1.88 and P being 1.35. Then, a solution (9.8 g) of stannous chloride dihydrate (2.45 g) in 3,6,9-trioxa-undecane was added and heating was continued for 5 h at a temperature of 160° C. until the reaction product was substantially free from epoxy groups, the epoxy group content of the polyether resin being 0.05 meq per g.

The reaction product obtained was cooled and further diluted with 1-methoxy-2-hydroxypropane until the diluted solution had a solids content of 35.7% by weight. The viscosity of the diluted solution at 23° C. was 1.9 Pa.s.

EXAMPLE 18

The reactor was charged with EPIKOTE ®1009 (624 g, a=0.321 meq per g, b=0.589 meq per g, $F_{epoxy}$=1.09), TMP (17 g) and Shellsol ®A (64 g) and was heated until a homogeneous liquid was obtained, the equivalent ratio $e_{OH}:e_{epoxy}$ being 1.88 and P being 1.54. Then, a solution (6.8 g) of stannous chloride dihydrate (1.7 g) in 3,6,9-trioxa-undecane was added and heating was continued for 3 h at a temperature of 170° C. until the reaction product was substantially free from epoxy groups, the epoxy group content of the polyether resin being 0.08 meq per g.

The reaction product obtained was cooled and further diluted with 1-methoxy-2-hydroxypropane until the diluted solution had a solids content of 35.7% by weight. The viscosity of the diluted solution at 23° C. was 6.9 Pa.s.

In the Examples 19 to 36, 40 and 41 curable clear coating compositions were prepared and evaluated as can coatings using the following four tests.

"MEK rubs" is the number of double rubs given to the cured coating with a cloth wetted with methyl ethyl ketone until the coating was wiped off.

The wedge bend test, a test for flexibility, was performed to test the suitability of the resin as a can coating. A coated tin plate panel is bent over a 3 mm mandrel, impacted into a wedge shape, and immersed for 3 minutes in an aqueous solution containing 2.5% by weight of $CuSO_4$ and 2.5% by weight of HCl. Any breaks in the film will be stained, and the staining is recorded in mm continuous staining per 10 cm total length of the panel. The scale is from 100 (bad) to 0 (excellent).

The sterilization resistance is measured by immersion for 90 min at 121° C. of the coated panels in water or a 2% by weight solution of lactic acid in water. The blush of the film is judged visually. The scale is from 0 (bad) to 5 (unaffected).

The pasteurization resistance is measured by immersion of the coated panels in a 1% by weight solution of lactic acid in water for 30 min at 80° C. The blush of the film is judged visually. The scale is from 0 (bad) to 5 (unaffected).

EXAMPLES 19 TO 27

Curable clear coating compositions were prepared by mixing the diluted solutions obtained in Examples 1, 3, 5, 7, 9, 10, 16, 17 and 18 with Cymel 301 ® in a weight ratio polyether resin to Cymel 301 ® of 80:20 until a homogeneous mixture was obtained, followed by addition of a 10% by weight solution of orthophosphoric acid in 1-methoxy-2-hydroxypropane, 0.175% by weight of $H_3PO_4$ calculated on the total of polyether resin and Cymel being used, and 1-methoxy-2-hydroxypropane until the curable coating composition contained 35% by weight of solids.

The curable coating compositions were tested as can coating materials by applying them with a bar coater onto tin plate panels. The panels were dried for 3 minutes at ambient temperature. After stoving for 3 minutes at the temperature shown in Table 6, the film was 6 micrometers thick and had the properties shown in Table 6.

TABLE 6

| Example | Composition from Example No. | Stoving Temperature, °C. | MEK Double rubs | Wedge bend, mm | Sterilization resistance in water | Pasteurization resistance |
|---|---|---|---|---|---|---|
| 19 | 1 | 160 | 10 | 20 | 5 | 5 |
| 20 | 3 | 160 | 15 | 10 | 4–5 | 5 |
| 21 | 5 | 150 | 40 | 5 | 5 | 5 |
| 22 | 7 | 150 | 50 | 5 | 5 | 5 |
| 23 | 9 | 140 | 30 | ≦5 | 5 | 5 |
| 24 | 10 | 140 | 10 | ≦5 | 5 | 4–5 |
| 25 | 16 | 140 | 15 | ≦5 | 5 | 4–5 |
| 26 | 17 | 150 | 50 | 10 | 4–5 | 4–5 |
| 27 | 18 | 140 | 10 | ≦5 | 5 | 5 |

The data presented in Table 6 show that the cured film had a very high sterilization and pasteurization resistance and a very good flexibility.

EXAMPLES 28 TO 36

Curable clear coating compositions were prepared by mixing the diluted solutions obtained in Examples 1, 3, 5, 7, 9, 10, 16, 17 and 18 with Phenodur ®PR 217 in a weight ratio polyether resin to phenol-formaldehyde resin of 70:30 until a homogeneous mixture was obtained, followed by addition of a 10% by weight solution of orthophosphoric acid in 1-methoxy-2-hydroxypropane, 0.3% by weight of $H_3PO_4$ calculated on the total of polyether resin and Phenodur ®PR 217 being used, and 1-methoxy-2-hydroxypropane until the curable coating composition contained 35% by weight of solids.

The curable clear coating compositions were tested as can coating materials by applying them with a bar coater onto tin plate panels. The panels were dried for 3 minutes at ambient temperature. After stoving for 10 minutes at the temperature mentioned in Table 7 the film was 6 micrometers thick and had the properties stated in Table 7 hereinafter.

TABLE 7

| Example | Composition from Example No. | Stoving Temperature, °C. | MEK Double rubs | Wedge bend, mm | Sterilization resistance in 2% lactic acid |
|---|---|---|---|---|---|
| 28 | 1 | 190 | 30 | 30 | 2–3 |
| 29 | 3 | 180 | 100 | 25 | 4–5 |
| 30 | 5 | 180 | 100 | 25 | 4 |
| 31 | 7 | 170 | 30 | 20 | 4–5 |
| 32 | 9 | 170 | 80 | 15 | 4–5 |
| 33 | 10 | 170 | 90 | 10 | 4 |
| 34 | 16 | 180 | 20 | 10 | 4 |
| 35 | 17 | 170 | 70 | 10 | 4–5 |
| 36 | 18 | 170 | >100 | ≦5 | 4–5 |

The high data presented in Table 7 show that the cured films had a very high sterilization resistance and a very good flexibility.

EXAMPLES 37 TO 39

Curable pigmented coating compositions were prepared by mixing polyether solution (160 g), Cymel ®301 (20 g), red iron oxide (92 g), clay (8 g), butyl OXITOL ® (120 g, "butyl OXITOL" is a tradename for 2-butoxyethanol), butanol (50 g) and orthophosphoric acid (0.25 g) using a high speed stirrer and glass pearls for grinding of the pigment particles. Stirring was continued until the pigment particles had a size below 10 micrometers. Table 8 shows which polyether solutions were used.

The curable pigmented coating compositions were tested by applying them with a bar coater onto galvanized steel panels known under the tradename of BONDER ®1303. The panels were dried for 20 min at ambient temperature. After stoving for 15 minutes at 200° C., the film was 20 to 25 micrometers thick and had the properties stated in Table 8.

TABLE 8

| Example | Composition from Example No. | MEK double rubs | Impact strength cm · kg | Salt spray resistance, mm loss of adhesion |
|---|---|---|---|---|
| 37 | 15 | 15 | 90 | 3 |
| 38 | 16 | 15 | >90 | 3 |
| 39 | 11 | 25 | >90 | 4 |

The MEK double rubs were determined in the manner described hereinbefore.

Impact strength is reverse impact strength determined according to the British Standard Falling Ball Test. An impact strength of at least 90 cm.kg is considered as very good.

Salt spray resistance was determined according to ASTM-B-117-64 and is recorded as mm loss of adhesion measured from scratch after 30 days. Salt spray resistances of less than 5 mm are considered as very good. The appearance of the coatings after the salt spray test was very good to excellent.

EXAMPLE 40

The experiment of Example 5 was repeated with the difference that xylene (52 g) was not present and that the reaction time was not 7.0 but 6.0 h. The epoxy group content of the polyether resin was 0.06 meq/g and the content of free TMP was 5.7% by weight.

The reaction product obtained was allowed to adopt ambient temperature. A first portion of the clear solid polyether resin thus obtained was dissolved in a mixture of 9 parts by weight of 1-methoxy-2-hydroxypropane and 1 part by weight of xylene to obtain a solution containing 50% by weight of solid material (solution A). This solution had a viscosity at 23° C. of 4.7 Pa.s. A second portion of the clear solid polyether resin was subjected to steam stripping for 0.5 h at a temperature of 180° C. and a pressure of 0.25 bar. The stripped polyether resin contained 3.0% by weight of free TMP and was dissolved in a mixture of 9 parts by weight of 1-methoxy-2-hydroxypropane and 1 part by weight of xylene to obtain a solution containing 50% by weight of solid material (solution B).

Curable clear coating compositions and cured films were prepared from solutions A and B in the same manner as described in Examples 28 to 36.

The films obtained had the properties stated in Table 9 hereinafter.

TABLE 9

| Composition from solution | Stoving temperature °C. | MEK double rubs | Wedge bend, mm | Sterilization resistance in 2% lactic acid |
|---|---|---|---|---|
| A | 170 | 20 | 20 | 4 |
| A | 180 | 40 | 20 | 4 |
| A | 190 | 100 | 20 | 4 |
| A | 200 | >100 | 25 | 4–5 |
| B | 170 | 20 | 15 | 4 |
| B | 180 | 40 | 15 | 4 |
| B | 190 | 90 | 15 | 4 |
| B | 200 | >100 | 15 | 4–5 |

Table 9 shows that removal of TMP results in an enhanced flexibility of the coating and does not affect the MEK resistance and sterilization resistance.

EXAMPLE 41

The reactor was charged with EPIKOTE ®828 (371 g, a=5.390 meq per g, b=5.422 meq per g, $F_{epoxy}$=1.99) and 1,1,1-tri(hydroxymethyl)ethane (150 g, 25 meq OH per g), $e_{OH}$:$e_{epoxy}$ being 1.88 and P being 1.13. The reactor was heated to a temperature of 140° C., stannous octoate (2.6 g) was added and the reactor was further heated to 170° C. at which temperature a clear solution was obtained. After heating for 8 hours at this temperature the reaction mixture was allowed to adopt ambient temperature. A clear solid mass was obtained which had an epoxy group content of 0.07 meq per g. The solid mass was dissolved in a mixture of 9 parts by weight of 1-methoxy-2-hydroxypropane and 1 part by weight of xylene to obtain a solution containing 50% by weight of solid material. This solution had a viscosity at 23° C. of 3.2 Pa.s.

A curable clear coating composition was prepared and applied in the same manner as in Examples 19 to 27 and the cured film was prepared by stoving for 3 min at 170° C. The film obtained had the following properties:

| MEK double rubs | 50 |
| Wedge bend, mm | 20 |
| Sterilization resistance in water | 5 |
| Pasteurization resistance | 4–5 |

COMPARATIVE EXPERIMENT D

The reactor was charged with EPIKOTE ®828 (371 g, a=5.390 meq/g, b=5.422 meq/g) and tetra(hydroxymethyl)methane (171 g, 29.4 meq OH per g), $e_{OH}$:$e_{epoxy}$ being 2.52, and was heated to 170° C., at which temperature stannous octoate (2.7 g) was added. After keeping the mixture at 170°–175° C. for 2.5 h the polyether resin formed had an epoxy group content of 1.97 meq/g. After further heating in this temperature range for 1.5 hours, a gel was formed.

This comparative experiment shows that the use of tetra(hydroxymethyl)methane, even with a very high ratio of OH to epoxy, results in the formation of a gel and not in a polyether resin which is substantially free from epoxy groups.

We claim:

1. A process for the preparation of a polyether resin which comprises:

contacting in a reaction mixture in the presence of an etherification catalyst a diglycidyl ether of a dihydric phenol having an average of less than two epoxy groups per molecule and an alcohol of the formula

in which R is a $C_1$–$C_4$ alkyl group, for a time sufficient to product a polyether resin reaction product substantially free from epoxy groups, the relative amounts of the diglycidyl ether and the alcohol being such that the equivalent ratio of $$\frac{e_{OH}}{e_{epoxy}}$$

is greater than 1, in which $e_{OH}$ is the total number of hydroxy equivalents introduced by the alcohol and $e_{epoxy}$ is the total number of epoxy equivalents introduced by the diglycidyl ether, and P is greater than 1.05, P being calculated according to formula (1)

$$P = \frac{e_{OH}}{3 \times e_{epoxy}} + \frac{1}{F_{epoxy}} \quad (1)$$

in which $F_{epoxy}$ is defined as $$2a/b$$

in which "a" and "b" are the concentrations of epoxy groups and of total end groups, respectively, in the starting diglycidyl ether.

2. The process of claim 1 in which R is selected from methyl and ethyl.

3. The process of claim 2 in which the alcohol is 1,1,1-tri(hydroxymethyl)propane.

4. The process of claim 1 in which the dihydric phenol is 2,2-bis(4-hydroxyphenyl)propane.

5. The process of claim 1 in which the equivalent ratio of hydroxyl groups in the alcohol to epoxy groups in the diglycidyl ether is not more than 5.

6. The process of claim 1 in which P is less than about 3.0.

7. The process of claim 6 in which P is less than about 2.0.

8. The process of claim 1 in which the etherification catalyst is a stannous salt.

9. The process of claim 8 in which the stannous salt is a salt of an alkanoic acid.

10. The process of claim 9 in which the alkanoic acid has from 2 to about 30 carbon atoms per molecule.

11. The process of claim 10 in which the etherification catalyst is stannous octoate.

12. The process of claim 8 in which the stannous salt is stannous chloride.

13. The process of claim 1 in which the reaction is carried out at a temperature in the range of from 125° C. to 200° C.

14. The process of claim 1 which further comprises separation of any unreacted alcohol from the polyether resin obtained.

15. The process of claim 14 in which the separation is carried out by means of stripping.

16. The process of claim 15 in which the stripping is carried out by means of steam.

17. A non-gelled polyether resin substantially free from epoxy groups prepared by the process of claim 1.

18. A curable coating composition comprising the polyether resin of claim 17 and a cross-linking resin.

19. A process for coating a surface which comprises applying to the surface the coating composition of claim 18, drying the composition and curing by action of heat.

* * * * *